(12) United States Patent
Maas

(10) Patent No.: US 11,818,974 B2
(45) Date of Patent: Nov. 21, 2023

(54) AERATION APPARATUS AND METHODS

(71) Applicant: PlanetAir Turf Products, LLC, Naples, FL (US)

(72) Inventor: David R. Maas, Naples, FL (US)

(73) Assignee: PlanetAir Turf Products, LLC, Naples, FL (US)

(*) Notice: Subject to any disclaimer, the term of this patent is extended or adjusted under 35 U.S.C. 154(b) by 424 days.

(21) Appl. No.: 16/992,317

(22) Filed: Aug. 13, 2020

(65) Prior Publication Data
US 2022/0046846 A1 Feb. 17, 2022

(51) Int. Cl.
*A01B 45/02* (2006.01)

(52) U.S. Cl.
CPC .................. *A01B 45/026* (2013.01)

(58) Field of Classification Search
CPC ............................. A01B 45/026; A01B 45/02
USPC ...................................... 172/22, 21
See application file for complete search history.

(56) References Cited

U.S. PATENT DOCUMENTS

| | | | | |
|---|---|---|---|---|
| 2,509,463 | A * | 5/1950 | Wade | A01B 43/00 172/554 |
| 2,591,572 | A * | 4/1952 | Mascaro | A01B 45/02 172/547 |
| 2,778,291 | A * | 1/1957 | Kerns | A01B 45/02 172/554 |
| 3,393,751 | A * | 7/1968 | Mascaro | A01B 45/02 267/153 |
| 3,522,965 | A * | 8/1970 | Indzeoski | A01B 1/243 294/50.7 |
| 3,993,143 | A | 11/1976 | Moreland | |
| D243,275 | S * | 2/1977 | van der Lely | D15/29 |
| 4,421,176 | A * | 12/1983 | Tuggle et al. | A01B 1/065 172/555 |
| 4,467,874 | A * | 8/1984 | Wittrock | A01B 33/08 172/548 |
| 5,183,120 | A * | 2/1993 | Watanabe | A01B 45/026 30/348 |
| 5,460,229 | A | 10/1995 | Mattis | |
| 5,469,922 | A | 11/1995 | Bjorge | |
| 5,586,603 | A | 12/1996 | Mattis | |
| 5,623,996 | A * | 4/1997 | Postema | A01D 42/04 56/320.1 |

(Continued)

OTHER PUBLICATIONS

International Search Report and Written Opinion in International Appln. No. PCT/US2021/045408, dated Nov. 29, 2021, 18 pages.

*Primary Examiner* — Thomas B Will
*Assistant Examiner* — Joel F. Mitchell
(74) *Attorney, Agent, or Firm* — Fish & Richardson P.C.

(57) ABSTRACT

An aeration tine includes a mounting portion removably connectable to an aeration apparatus and defining a central axis; and a curved blade portion that extends longitudinally from the mounting portion to a tip of the aeration tine and that is operable to fracture soil and form an aeration pocket. The curved blade portion includes a concave first edge and an opposed convex second edge, wherein the concave first edge includes (i) a proximal first edge portion, (ii) a distal first edge portion proximal the tip of the aeration tine, and (iii) a middle first edge portion between the proximal first edge portion and the distal first edge portion, the middle first edge portion closer to the central axis than both the proximal first edge portion and the distal first edge portion.

19 Claims, 9 Drawing Sheets

(56) References Cited

U.S. PATENT DOCUMENTS

| | | | |
|---|---|---|---|
| 5,765,645 A * | 6/1998 | Postema | A01B 45/02 |
| | | | 172/21 |
| 6,513,603 B2 | 2/2003 | Bjorge | |
| 7,484,568 B2 * | 2/2009 | Vasilescu | A01B 33/103 |
| | | | 172/540 |
| D655,725 S * | 3/2012 | Lewis | D15/29 |
| 9,516,800 B2 | 12/2016 | Maas | |
| 9,713,297 B2 * | 7/2017 | Bos | A01B 33/142 |
| 2003/0230417 A1 | 12/2003 | Maas | |
| 2004/0016553 A1 * | 1/2004 | Martindale | A01B 33/103 |
| | | | 172/21 |
| 2005/0000706 A1 | 1/2005 | Maas et al. | |
| 2005/0000707 A1 | 1/2005 | Maas et al. | |
| 2005/0000708 A1 | 1/2005 | Bjorge | |
| 2005/0034878 A1 | 2/2005 | Bjorge | |
| 2005/0173133 A1 | 8/2005 | Maas et al. | |
| 2005/0173134 A1 | 8/2005 | Maas et al. | |
| 2006/0131039 A1 | 6/2006 | Maas et al. | |
| 2015/0150183 A1 | 6/2015 | Maas | |
| 2016/0219780 A1 | 8/2016 | Maas | |

* cited by examiner

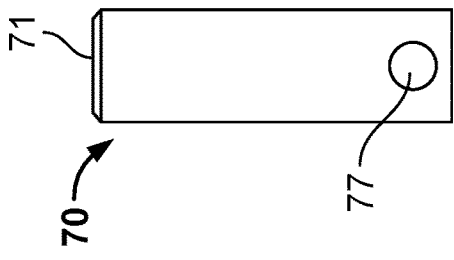
FIG. 5C
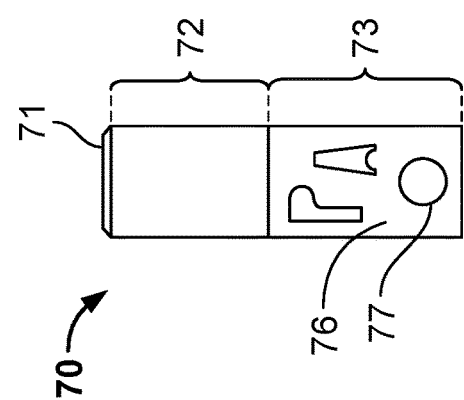
FIG. 5F
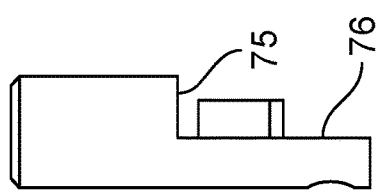
FIG. 5B
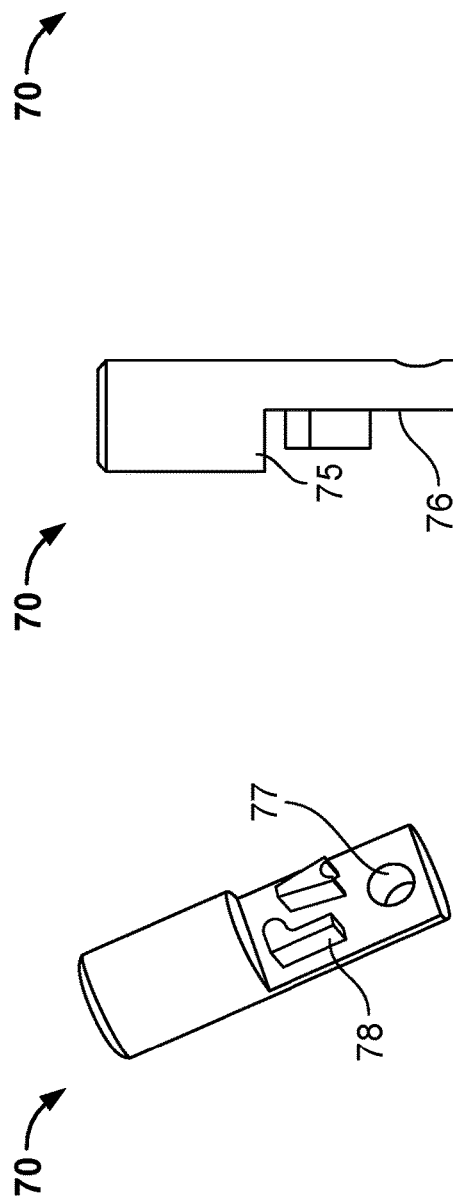
FIG. 5A
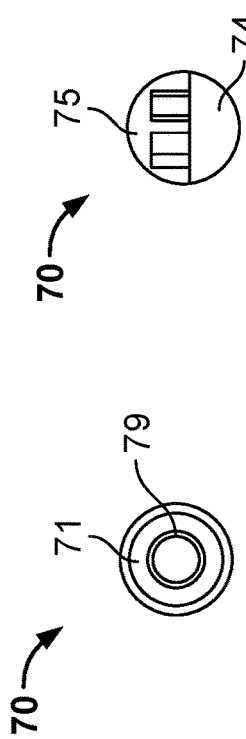
FIG. 5G
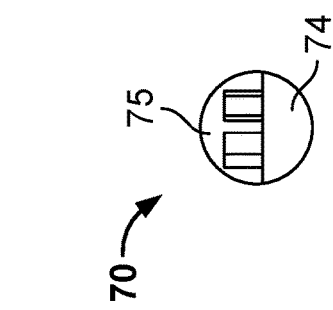
FIG. 5E
FIG. 5D

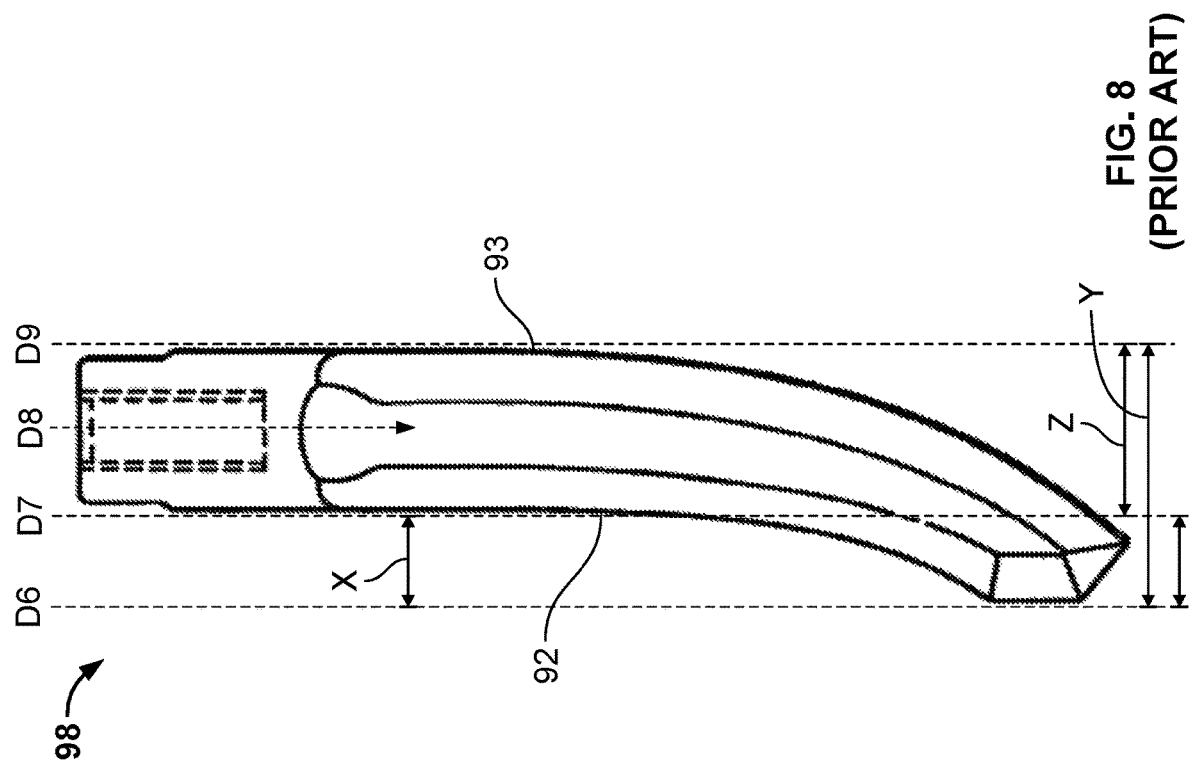
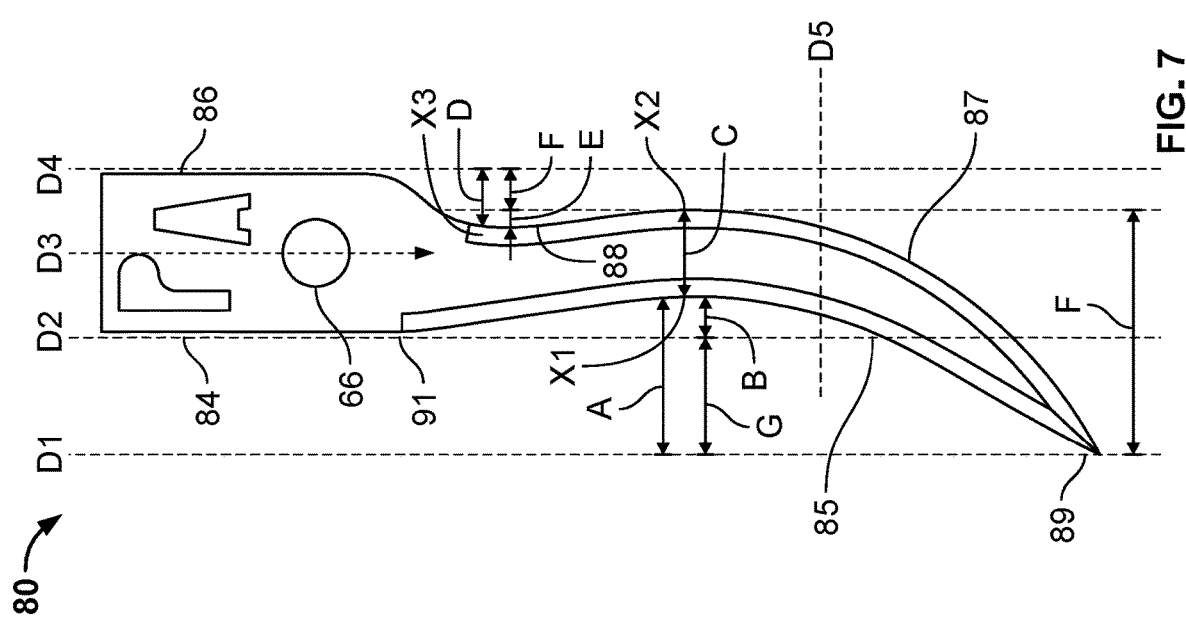

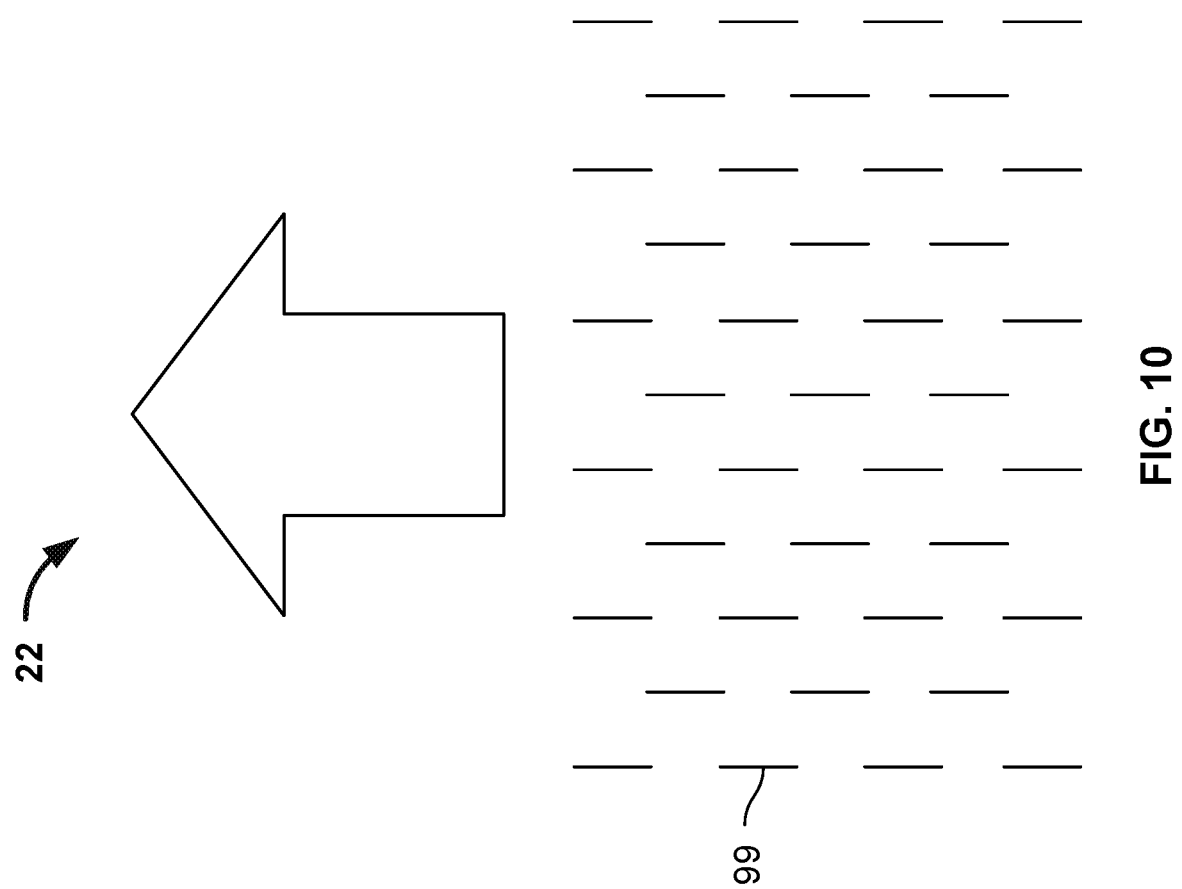

_US 11,818,974 B2_

AERATION APPARATUS AND METHODS

TECHNICAL FIELD

This document relates to treating a ground surface, such as a system and method for aerating a ground surface.

BACKGROUND

Soil aeration is a conventional technique used by groundskeepers to reduce compaction in the ground soil, stimulate plant growth, and promote proper drainage. Soil may become compacted from overuse or environmental effects, which ultimately affects the soil permeability and development of rooted plants within the soil. In particular, compacted soil restricts the amount of oxygen that can enter the soil and the amount of carbon dioxide that can escape. Not all soils are affected equally by overuse and environmental factors. The amount of compaction depends on soil composition, the amount of vegetation, and the moisture content of the soil. Periodic soil aeration relieves the compaction in the soil before the negative effects overburden the soil to the point that the soil can no longer support desirable vegetation. Some aeration systems can be relatively complex, bulky, heavy, and consequently expensive and complex to manufacture and operate.

SUMMARY

Some embodiments of an aeration apparatus can include one or more of the features and functions disclosed herein. The aeration apparatus may be equipped with a plurality of aeration tines having a mounting portion and blade portion configured to reduce compaction of soil as the tines form aeration pockets in the ground. Optionally, the blade portion of each aeration time can include convex blade edge and concave blade edge that are positioned relative to the mounting portion in manner to achieve improved performance during use of the aeration apparatus and improved soil aeration effects in the days or weeks following the formation of the aeration pockets.

As additional description to the embodiments described below, the present disclosure describes the following embodiments.

Embodiment 1 is an aeration tine assembly, comprising an aeration tine that includes: a mounting portion removably connectable to an aeration apparatus and defining a central axis that extends longitudinally through the mounting portion; and a curved blade portion that extends longitudinally from the mounting portion to a tip of the aeration tine and that is operable to fracture soil and form an aeration pocket, the curved blade portion including a concave first edge and an opposed convex second edge. The concave first edge includes (i) a proximal first edge portion proximal the mounting portion, (ii) a distal first edge portion proximal the tip of the aeration tine, and (iii) a middle first edge portion between the proximal first edge portion and the distal first edge portion, the middle first edge portion closer to the central axis than both the proximal first edge portion and the distal first edge portion. The curved blade portion defines a blade width along a width dimension that is transverse to the central axis and that extends in a plane extending through the concave first edge and the convex second edge, and a blade thickness along a thickness dimension that is transverse to both the central axis and the width dimension, the blade width at the middle first edge portion being greater than the blade thickness.

Embodiment 2 is the aeration tine assembly of embodiment 1, wherein the curved blade portion and the mounting portion are integrally formed from a same material.

Embodiment 3 is the aeration tine assembly of any one of embodiments 1-2, wherein the mounting portion includes a first mounting portion edge and an opposed second mounting portion edge that are parallel to each other and to the central axis.

Embodiment 4 is the aeration tine assembly of any one of embodiments 1-3, wherein the aeration tine assembly is removably connectable to a mounting element of the aeration apparatus such that the central axis of the mounting portion aligns with a central axis of the mounting element of the aeration apparatus.

Embodiment 5 is the aeration tine assembly of any one of embodiments 1-4, wherein the concave first edge and the convex second edge converge at the tip of the aeration tine.

Embodiment 6 is the aeration tine assembly of embodiment 5, wherein the tip of the aeration tine is a most distal feature of the aeration tine with respect to the mounting portion.

Embodiment 7 is the aeration tine assembly of embodiment 6, wherein the tip of the aeration tine is a feature of the aeration tine located furthest away from the central axis in a direction along the width dimension and oriented from the convex second edge toward the concave first edge.

Embodiment 8 is the aeration tine assembly of any one of embodiments 1-7, wherein: the curved blade portion defines a first apex of the concave first edge where the curved blade portion is closest to the central axis; the curved blade portion defines a starting location of the concave first edge where the concave first edge meets the mounting portion; the curved blade portion defines a first distance along the width dimension between the first apex of the concave first edge and the starting location of the concave first edge; the curved blade portion defines a second distance along the width dimension between the first apex of the concave first edge and the tip of the aeration tine; and the second distance is greater than the first distance.

Embodiment 9 is the aeration tine assembly of embodiment 8, wherein the second distance is at least three times the first distance.

Embodiment 10 is the aeration tine assembly of embodiment 8, wherein the second distance is about four times the first distance.

Embodiment 11 is the aeration tine assembly of embodiment 8, wherein the first distance is about 4.5 mm and the second distance is about 18.5 mm.

Embodiment 12 is the aeration tine assembly of embodiment 11, wherein: the curved blade portion has a blade length along the center axis from the starting location of the concave first edge to the tip of the concave blade portion of about 79 mm, and the blade thickness is about 1.5 mm.

Embodiment 13 is the aeration tine assembly of any one of embodiments 1-12, wherein the concave first edge does not extend through the center axis.

Embodiment 14 is the aeration tine assembly of any one of embodiments 1-13, the convex second edge defines a second apex where the convex second edge is furthest from the central axis in a direction along the width dimension and oriented from the concave first edge to the convex second edge.

Embodiment 15 is the aeration tine assembly of embodiment 14, wherein: the curved blade portion defines a curvature width along the width dimension between the second apex of the convex second edge and the tip of the aeration tine; and the curvature width is at least twice the blade width.

Embodiment 16 is the aeration tine assembly of embodiment 15, wherein the curvature width is about three times the blade width.

Embodiment 17 is the aeration tine assembly of any one of embodiments 14-15, wherein: the concave first edge is located on a first side of the aeration tine; the convex second edge is located on a second side of the aeration tine opposite the first side of the aeration tine; the mounting portion includes a first mounting portion edge on the first side of the aeration tine and an opposed second mounting portion edge on the second side of the aeration tine; the curved blade portion includes a concave second edge between the second mounting edge and the convex second edge.

Embodiment 18 is the aeration tine assembly of embodiment 17. wherein the concave second edge does not pass through the central axis.

Embodiment 19 is the aeration tine assembly of any one of embodiments 1-18, further comprising an aeration tine holder that defines a bore that is aligned with the central axis, the bore shaped to receive a mounting element of the aeration assembly, wherein the aeration tine is releasably connectable to the aeration tine holder.

Embodiment 20 is the aeration tine assembly of embodiment 19, wherein: the bore is located at a first end of the aeration tine holder; the aeration tine holder defines a first opening transverse to the central axis, the first opening located at a second end of the aeration tine holder opposite from the first end of the aeration tine holder; the mounting portion of the aeration tine defines a second opening transverse to the central axis; and the aeration tine assembly further comprises a fastener that extends through the first opening of the aeration tine holder and the second opening of the aeration tine when the aeration tine is releasably connected to the aeration tine holder.

Embodiment 21 is an aeration apparatus comprising: an aeration rotor configured for movement in a planetary motion about an axis, wherein the aeration rotor is configured to penetrate a ground surface when the aeration rotor is rotated, the aeration rotor including: a first carrier and a second carrier; a first tine-holder shaft extending between the first carrier and the second carrier; a first set of aeration tine assemblies attached to the first tine-holder shaft; a second tine-holder shaft extending between the first carrier and the second carrier; a second set of aeration tine assemblies attached to the second tine-holder shaft. Each aeration tine assembly in the first set of aeration tine assemblies and the second set of aeration tine assemblies comprises an aeration tine that includes: a mounting portion removably connectable to one of the first and second tine-holder shafts and defining a central axis that extends longitudinally through the mounting portion; and a curved blade portion that extends longitudinally from the mounting portion to a tip of the aeration tine and that is operable to fracture soil and form an aeration pocket, the curved blade portion including a concave first edge and an opposed convex second edge. The concave first edge includes (i) a proximal first edge portion proximal the mounting portion, (ii) a distal first edge portion proximal the tip of the aeration tine, and (iii) a middle first edge portion between the proximal first edge portion and the distal first edge portion, the middle first edge portion closer to the central axis than both the proximal first edge portion and the distal first edge portion. The curved blade portion defines a blade width along a width dimension that is transverse to the central axis and that extends in a plane extending through the concave first edge and the convex second edge, and a blade thickness along a thickness dimension that is transverse to both the central axis and the width dimension, the blade width at the middle first edge portion being greater than the blade thickness.

Embodiment 22 is the aeration apparatus of embodiment 21, further comprising: a motor operably connected to the aeration rotor to drive rotation of the aeration rotor such that the aeration tine assemblies can penetrate and exit a ground surface when the aeration rotor is rotated; and a frame supporting the aeration rotor and the motor and having a handle configured to be held by a user walking behind the aeration apparatus.

Embodiment 23 is the aeration apparatus of any one of embodiments 21-22, wherein the aeration rotor rotates in a first direction and the first tine-holder shaft and the second tine-holder shaft rotate in a second direction opposite of the first direction during rotation of the aeration rotor in the first direction.

Embodiment 24 is an aeration tine configured for attachment to a planetary aeration apparatus, the tine comprising: a mounting portion defining a central axis that extends longitudinally through the mounting portion; and a curved blade portion that extends longitudinally from the mounting portion to a distal tip and that is operable to fracture soil and form an aeration pocket, the curved blade portion including a concave first edge and an opposed convex second edge.

Some or all of the embodiments described herein may provide one or more of the following advantages.

First, some embodiments of the aeration apparatus can be configured to reduce compaction of soil as tines of the aeration apparatus are inserted into and withdrawn from the ground. The tines optionally may be shaped as curved blades that form aeration pockets during insertion, and the blades can include a distal portion with an arcuate shape that, when traveling the ground in a planetary motion, can beneficially limit soil compaction along a front portion of the aeration pocket during withdrawal.

Second, the arcuate shape of the tines results in aeration pockets being formed largely or entirely as the tines are inserted into the soil, such that there is limited or no contact between the tine and the soil as the tines are withdrawn from the soil. This limits the amount of soil flung out of the aeration pockets and onto the surface of the ground.

Third, some embodiments of the aeration apparatus limit wear on tines of the aeration apparatus. For example, each of the tines may include a concave edge and an opposed convex edge that converge at a pointed tip, and insertion of the pointed tip into ground pierces the soil gradually to spread the cutting action over a length of at least the convex edge, which can reduce wear on the tips of the tines and extend the operational life of the tines.

Fourth, some embodiments of the aeration apparatus are able to operate at relatively high travel speeds over the ground surface. For example, the shape of the tines may limit the resistance imparted upon the aeration apparatus during penetration of the blade portions into the ground, thereby providing the option for the aeration apparatus to traverse over the ground surface at meaningfully higher speeds and/or with reduced fuel consumption, as compared to many traditional aerators. Optionally, the reduced resistance (during penetration of the blade portions into the ground) provides the opportunity to equip the aeration apparatus with a comparatively smaller motor, reducing an overall weight of the aeration apparatus.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5A is a perspective view of the aeration tine holder of FIG. 4.

FIG. 5B is a rear view of the aeration tine holder of FIG. 4.

FIG. 5C is a front view of the aeration tine holder of FIG. 4.

FIG. 5D is a top view of the aeration tine holder of FIG. 4.

FIG. 5E is a bottom view of the aeration tine holder of FIG. 4.

FIG. 5F is a right side view of the aeration tine holder of FIG. 4.

FIG. 5G is a left side view of the aeration tine holder of FIG. 4.

FIG. 7 is a left side view of the aeration tine of FIG. 4 with multiple dimensions labelled.

FIG. 8 is a left side view of a prior art tine with multiple dimensions labelled.

FIG. 10 is a top view of a ground surface having soil aerated in accordance with certain embodiments of the aeration apparatus.

Like reference symbols in the various drawings indicate like elements.

DETAILED DESCRIPTION OF ILLUSTRATIVE EMBODIMENTS

Figure 1:
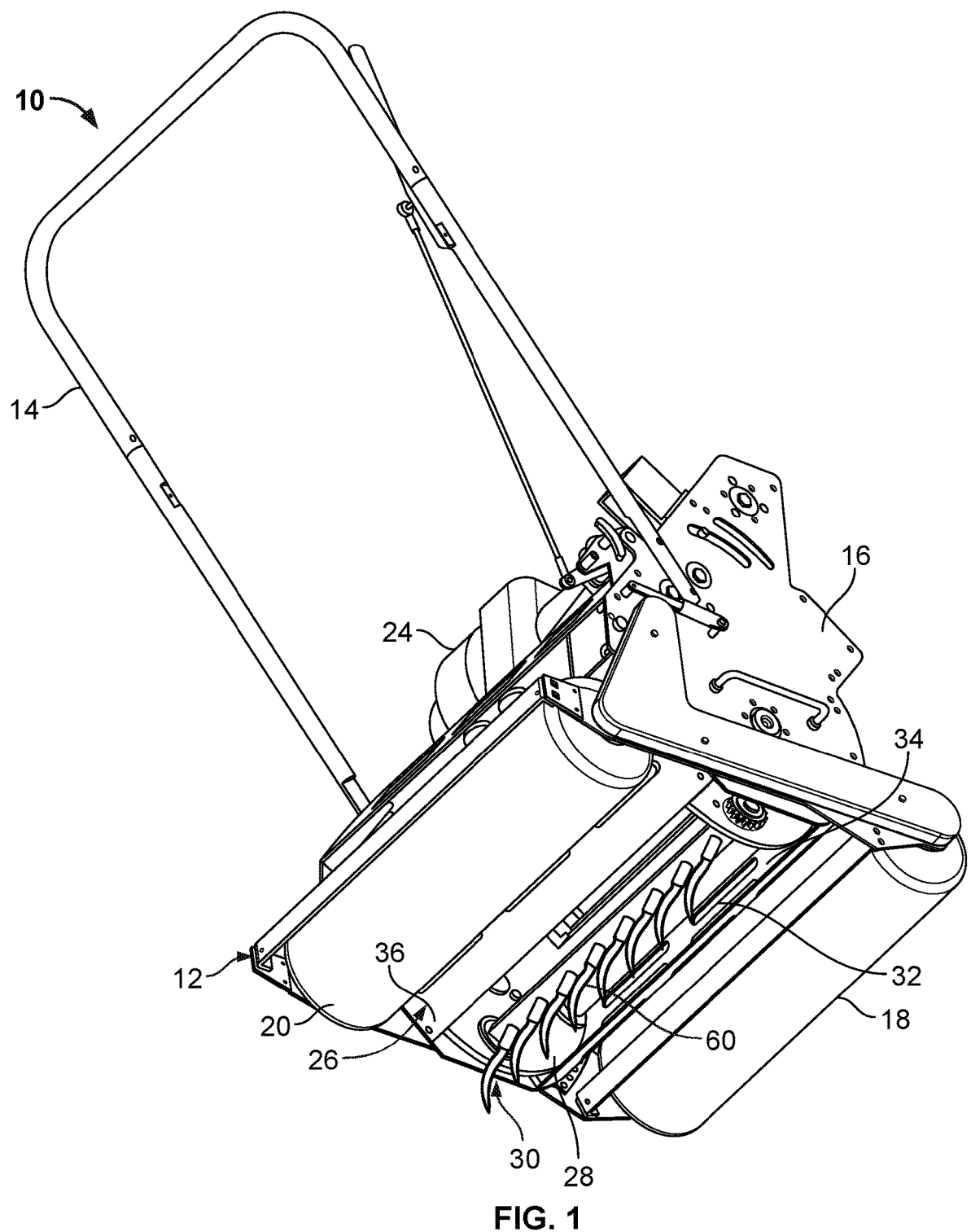
FIG. 1 is a perspective bottom view of an aeration apparatus in accordance with an embodiment of the invention.
Figure 2:
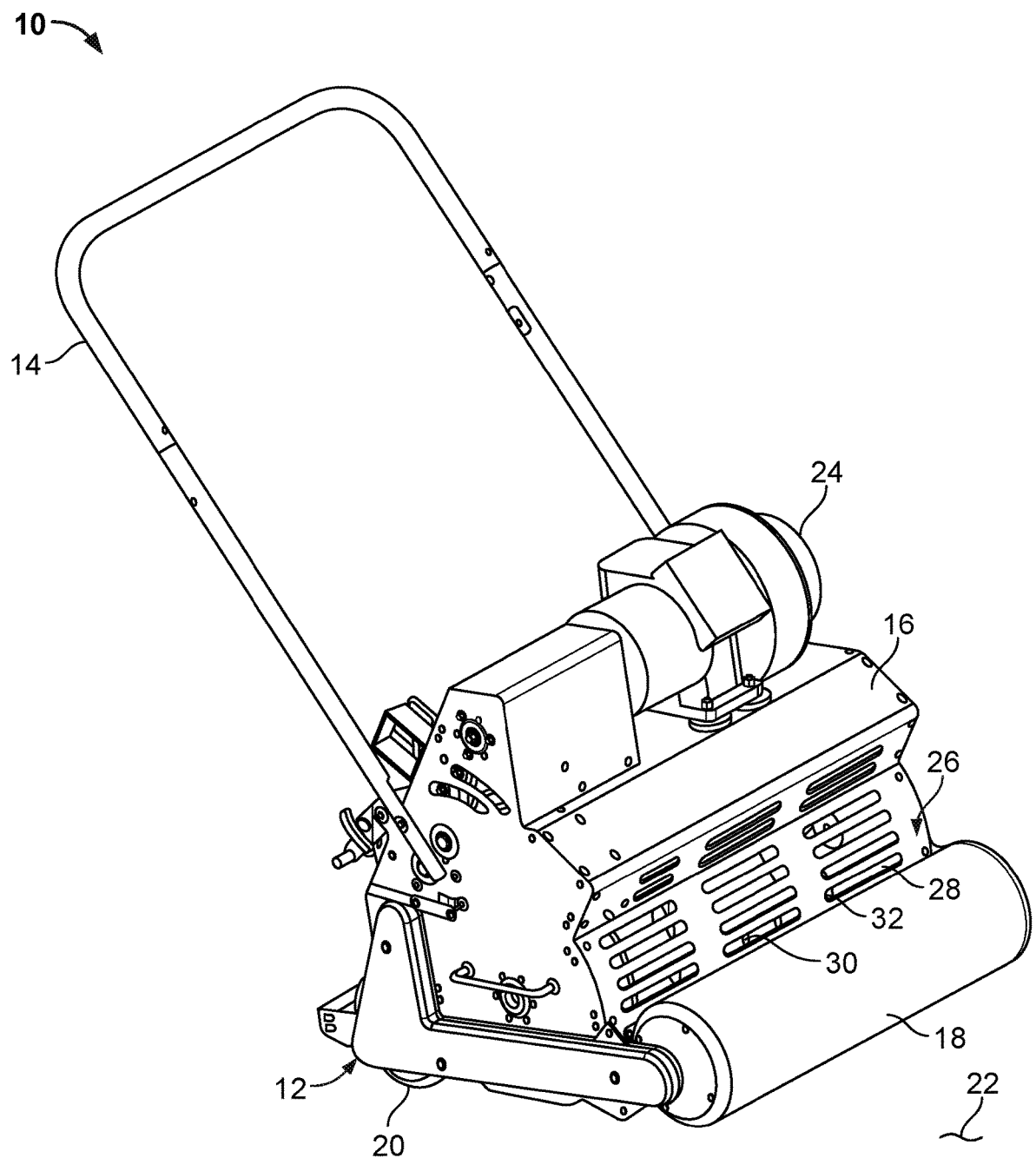
FIG. 2 is a perspective top view of the aeration apparatus of FIG. 1.

Referring to FIG. 1, which is a perspective bottom view of an aeration apparatus, and FIG. 2, which is a perspective top view of the aeration apparatus, some embodiments of an aeration apparatus 10 include a frame 12 which includes a handle 14 and a housing 16. The frame 12 is connected to a pair of wheels 18 and 20, which are configured for traveling over a ground surface 22 to facilitate movement of the aeration apparatus 10. The housing 16 surrounds and at least partially encloses components of the aeration apparatus 10, including aeration tine assemblies 60 attached to rotating tine-holder shafts. Each aeration tine assembly 60 includes a curved blade portion to rotatably pierce the ground surface 22 to form aeration pockets, as described in more detail below in connection with FIGS. 4, 5A-G, 6A-G, 7, and 9A-H.

In the illustrated embodiment, the housing 16 is part of the frame 12, providing structural support for the aeration apparatus 10. A motor 24 is mounted to and supported by the housing 16. The handle 14 is mounted to and supported by the housing 16. In other embodiments, the housing 16 need not be part of the frame 12, but rather can be a non-structural enclosure supported by the frame 12.

In the illustrated embodiment, the wheel 18 is a front wheel and the wheel 20 is a rear wheel. The handle 14 can be mounted in a position and configured to facilitate a user to walk behind and push the aeration apparatus 10. For example, in the illustrated embodiment the handle 14 is a substantially U-shaped handle with ends mounted to left and right sides of the housing 16 so as to extend rearward behind the aeration apparatus 10.

In some embodiments, the motor 24 can be operably connected to one or more of the wheels 18 and 20 so as to drive movement of the aeration apparatus 10 with or without force provided by the user. The aeration apparatus 10 can be operated as a push or walk-behind system without requiring a vehicle to tow or otherwise propel the aeration apparatus 10. In other embodiments, the aeration apparatus 10 can be modified for use with a towing vehicle.

The aeration apparatus 10 includes a shield 26 defining a rotor cavity 28 and at least partially surrounding an aeration rotor 30 in the rotor cavity 28. The shield 26 defines sifting ports 32 extending through the shield 26 to create a passage from the rotor cavity 28 to an exterior of the shield 26. Visibility of the rotor cavity 28 and the aeration rotor 30 are obscured from a top view as seen in FIG. 2 but can be partially seen through the sifting ports 32. The shield 26 can be a shield system that includes a front shield 34 and a rear shield 36 that combine to define the rotor cavity 28. Aeration tine assemblies 60 are attached to and part of the aeration rotor 30.

Figure 3:
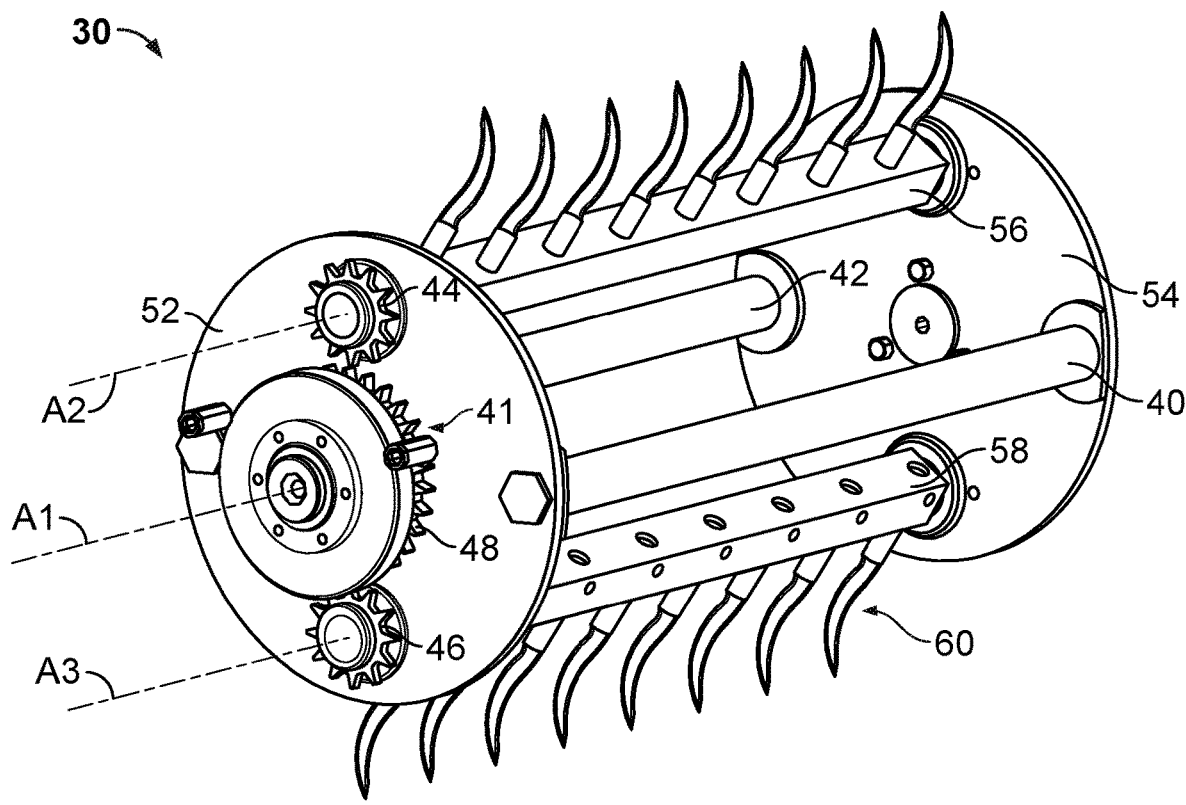
FIG. 3 is a perspective view of the aeration apparatus of FIG. 1 with portions of a housing removed.

Referring to FIG. 3, which is a perspective view of the aeration apparatus of FIG. 1 with portions of the housing 16 removed, the aeration rotor 30 includes two opposing carriers 52 and 54 and includes two tine-holder shafts 56 and 58 extending between the carriers 52 and 54. The tine-holder shafts 56 and 58 are rotatably mounted to the carriers 52 and 54 such that each shaft can rotate about its own axis. The carriers 52 and 54 can be rotatable with respect to the frame 12 (shown in FIGS. 1 and 2) about a first axis A1, the tine-holder shaft 56 can be rotatable with respect to the carriers 52 and 54 about a second axis A2, and the tine-holder shaft 58 can be rotatable with respect to the carriers 52 and 54 about a third axis A3.

The tine-holder shafts 56 and 58 are positioned substantially parallel in an axial direction, and the aeration tine assemblies 60 extend from each tine-holder shaft 56 and 58 in a radial direction. The aeration tine assemblies 60 can penetrate a ground surface. Two non-centrally located shafts 40 and 42 also extend between the opposing carriers 52 and 54. The shafts 40 and 42 can be fixedly mounted to the carriers 52 and 54 and provide mechanical support for the aeration apparatus 10 when in operation.

The gear system 41 is engaged with the tine-holder shafts 56 and 58 to cause rotation of the tine-holder shafts 56 and 58. The gear system 41 has a plurality of planetary gears 44 and 46 for each sun gear 48. Each of the tine-holder shafts 56 and 58 has a planetary gear 44 or 46 attached thereto. In some embodiments, the sun gear 48 can be positioned between the planetary gears 44 and 46 and engaged with the planetary gears 44 and 46 using a drive chain (not shown). Because two planetary gears 44 and 46 are operated using an individual sun gear 48, the bulkiness of the gear system 41 can be reduced. The aeration rotor 30 need not use a centrally located support shaft and the tine-holder shafts 56 and 58 can be positioned closer to one another, thus reducing overall size of the aeration apparatus 10. Rotation of the tine-holder shafts 56 and 58 can turn the aeration tine assemblies 60 to sweep through a central portion of the aeration rotor 30, overlapping the aeration tine assemblies 60 on the tine-holder shaft 56 with the aeration tine assemblies 60 on the tine-holder shaft 58 such that the aeration tine assemblies 60 on both of the tine-holder shafts 56 and 58 sweep through the first axis A1.

The planetary gear 44 can be axially aligned with the tine-holder shaft 56 and fixedly mounted to a portion of the tine-holder shaft 56 extending through the carrier 52. Similarly, the planetary gear 46 can be axially aligned with the tine-holder shaft 58 and mounted to a portion of the tine-holder shaft 58 extending through the carrier 52. In some embodiments, the planetary gears 44 and 46 can be aligned with the sun gear 48 such that a single drive chain can be engaged with all three gears 44, 46, and 48. The sun gear 48 can be axially aligned with the first axis A1 of the carriers 52 and 54 and remain substantially fixed as the carriers 52 and 54 rotate. When the carriers 52 and 54 rotate, the tine-holder shafts 56 and 58 can be driven to revolve around the first axis A1. Likewise, the planetary gears 44 and 46 can also revolve around the first axis A1. As such, the planetary gears 44 and 46 revolve about the sun gear 48 as the drive chain causes the planetary gears 44 and 46 to rotate.

The motion of revolving the tine-holder shafts 56 and 58 about the first axis A1 while rotating the tine-holder shafts 56 and 58 about the second and third axes A2 and A3 can cause motion of the aeration tine assemblies 60 to penetrate the ground surface 22 (shown in FIG. 1). A gear ratio of the sun gear 48 to the planetary gears 44 and 46 can be 2:1 such that the tine-holder shafts 56 and 58 go through two revolutions for every revolution of the aeration rotor 30.

The shafts 40 and 42 can be positioned between the carriers 52 and 54 and mounted near a perimeter of each carrier 52 and 54. Because the shafts 40 and 42 are non-centrally located (e.g., offset from the first axis A1), the tine-holder shafts 56 and 58 may be positioned closer to the first axis A1 without interference from the tines 60 hitting a centrally located shaft that may be present in other designs. Rather, the tine-holder shafts 56 and 58 may rotate as the aeration tine assemblies 60 pass through the first axis A1 without interference. A compact arrangement of shafts 56, 58, 40, and 42 can reduce overall size of the aeration apparatus 10 in comparison to other apparatuses.

Figure 4:
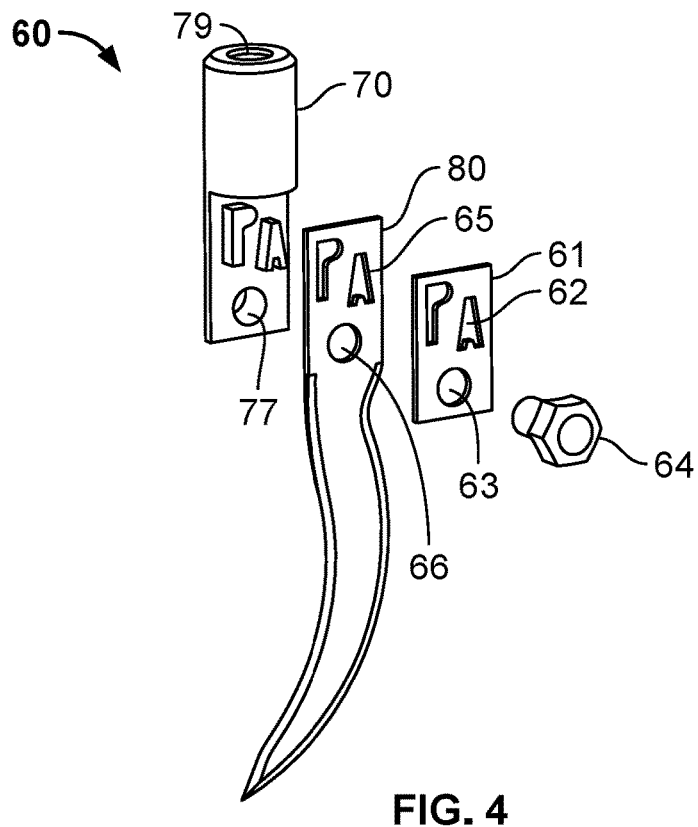
FIG. 4 is a perspective view of an aeration tine assembly, including an aeration tine and an aeration tine holder, for use in the aeration apparatus of FIG. 1.

FIG. 4 shows a perspective view of an aeration tine assembly for use in the aeration apparatus of FIG. 1. The aeration tine assembly 60 includes a tine holder 70, a tine 80, a retaining plate 61, and a fastener 64.

Various views of the tine holder 70 are shown in FIGS. 5A-G. FIG. 5A is a perspective view of the tine holder 70. FIG. 5B is a rear view of the tine holder 70. FIG. 5C is a front view of the tine holder 70. FIG. 5D is a top view of the tine holder 70. FIG. 5E is a bottom view of the tine holder 70. FIG. 5F is a right side view of the tine holder 70. FIG. 5G is a left side view of the tine holder 70.

Figure 6A:
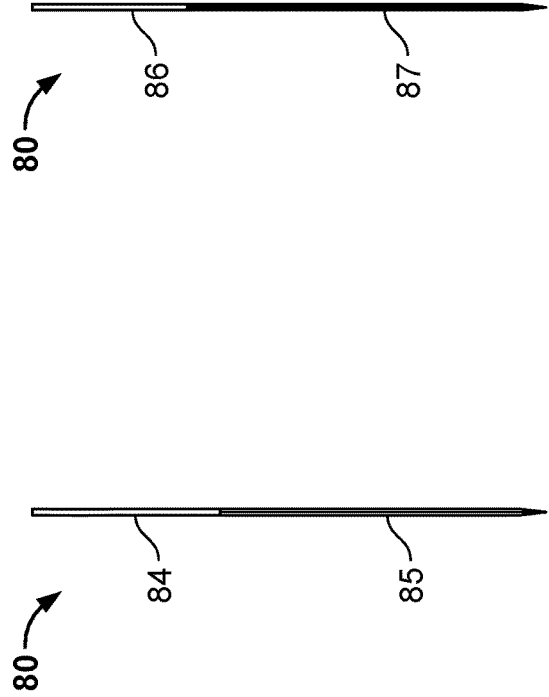
FIG. 6A is a perspective view of the aeration tine of FIG. 4.
Figure 6B:
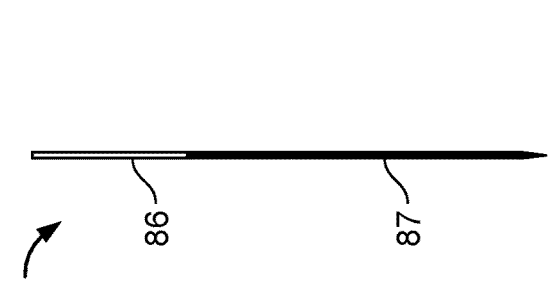
FIG. 6B is a rear view of the aeration tine of FIG. 4.
Figure 6C:
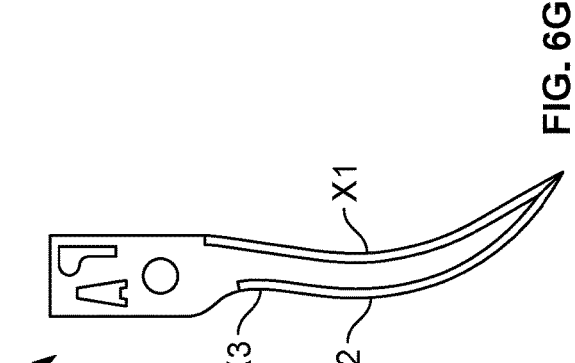
FIG. 6C is a front view of the aeration tine of FIG. 4.
Figures 6D, 6E:
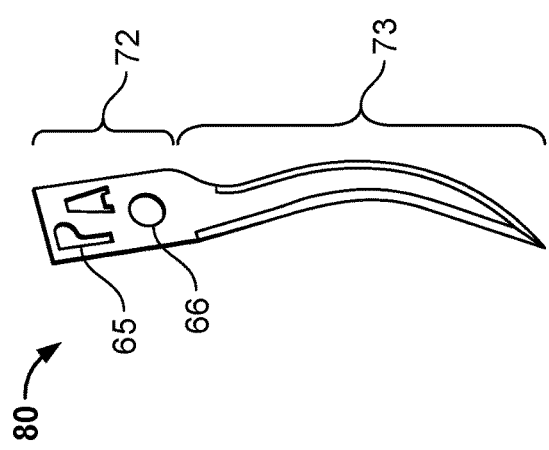
FIG. 6D is a top view of the aeration tine of FIG. 4.
FIG. 6E is a bottom view of the aeration tine of FIG. 4.
Figure 6F:
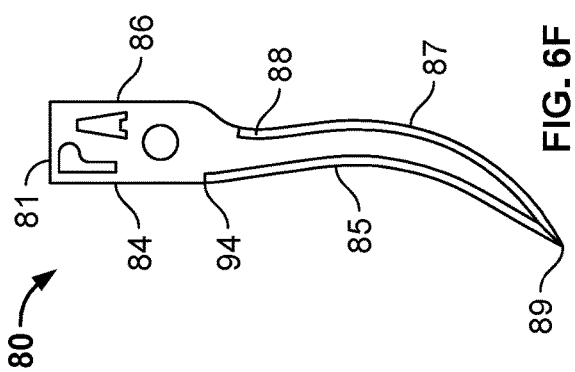
FIG. 6F is a right side view of the aeration tine of FIG. 4.
Figure 6G:
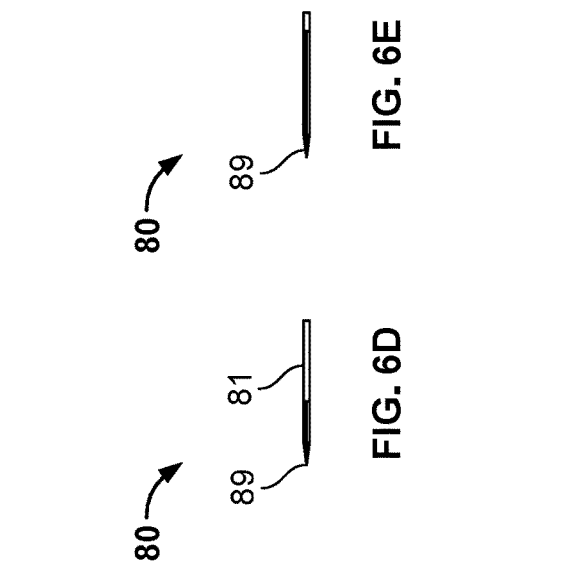
FIG. 6G is a left side view of the aeration tine of FIG. 4.

Various views of the tine 80 are shown in FIGS. 6A-G. FIG. 6A is a perspective view of the tine 80. FIG. 6B is a rear view of the tine 80. FIG. 6C is a front view of the tine 80. FIG. 6D is a top view of the tine 80. FIG. 6E is a bottom view of the tine 80. FIG. 6F is a right side view of the tine 80. FIG. 6G is a left side view of the tine 80.

The tine 80 is releasably fastened to the tine holder 70 by:
(1) mounting the tine 80 to the tine holder 70 so that the "PA" protrusions 78 of the tine holder 70 extend through the "PA" apertures 65, and so that the aperture 77 in the tine holder 70 aligns with the aperture 66 in the tine 80;
(2) mounting the retaining plate 61 so that the "PA" protrusions 78 of the tine holder 80 extend through the "PA" apertures 62 in the retaining plate 61, and so that the aperture 66 in the tine holder 70 aligns with the aperture 63 in the retaining plate 61; and
(3) inserting the fastener 64 through aperture 63, aperture 66, and aperture 77, which are aligned with each other.

The aperture 77 may extend all the way through the tine holder 70 and may be threaded so that the fastener 64 screws threads of a peripheral wall of the aperture 77. In some examples, the aperture 77 does not extend all the way through the tine holder 70 and instead forms a depression in the tine holder 70. In some examples, the fastener 64 mates with a nut on back side of tine holder 70 to mechanically sandwich the retaining plate 61, the tine 80, and the tine holder 70 between the fastener 64 and the nut. In such examples, the aperture 77 may not be threaded.

The tine holder 70 includes a first end portion 72 and a second end portion 73. The first end portion 72 is adapted to attach the tine holder 70 to one of the tine-holder shafts 56 and 58 of the aeration apparatus 10. The first end portion 72 of the tine holder 70 includes a threaded bore 79 extending through a top surface 71 of the tine holder 70, enabling the tine holder 70 to be threaded onto a fastener. The fastener may be one that extends normally to one of the threaded shafts 56 and 58 such that the tine holder 70 extends normally from one of the threaded shafts 56 and 58 when attached thereto. In some examples, the fastener may be a set screw that is threaded through an aperture in the respective tine-holder shaft so that the tine holder 70 may be fastened to the respective tine-holder shaft at a desired orientation.

The second end portion 73 of the tine holder 70 includes a face 76 from which the "PA" protrusions 78 extend. The aperture 77 extends through the second end 73, although in some examples the aperture 77 only extends partially through the tine holder 70, as described above. Opposing and parallel to the top surface 71 of the tine holder 70 is a bottom surface 74. Also parallel to the top surface 71 and the bottom surface is an intermediate surface 75.

The tine holder has a height of about 60 mm and a width of about 19 mm. A height of The face 76 has a height of about 32 mm and a width of about 19 mm.

The tine 80 includes a mounting portion 72 and a curved blade portion 73 that extends therefrom. The mounting portion 72 is sandwiched between the face 76 of the tine holder 70 and the retaining plate 62 when the aeration tine assembly 60 is assembled, as described above. The mounting portion 72 includes a top surface 81, a first mounting portion edge 84, and second mounting portion edge 86 that opposes the first mounting portion edge 84.

The curved blade portion 73 extends to a tip 89, and includes a concave first edge 85 and an opposed convex second edge 87. A concave second edge 88 is located between the second mounting portion edge 86 and the convex second edge 87. Each of edges 85, 87, and 88 may provide a cutting edge, beveled on one side or both sides of the respective cutting edge. In some embodiments, concave edge 85 is not beveled and does not provide a cutting edge.

FIGS. 7 and 8 show various measurements of the tine 80 (FIG. 7) and a prior art tine 98 (FIG. 8). The tine 80 defines a central axis D3, which represents a dimension normal to the tine-holder shaft 56 or 58 to which the tine 80 is attached. The central axis D3 may align with the bore 79 in the tine holder 70. In some examples, the central axis D3 passes through a center of aperture 66. In some examples, the first mounting portion edge 84 and the second mounting portion edge 86 are each parallel to the central axis D3 and equally spaced apart from the central axis D3. The tine 80 defines a width dimension D5 that is transverse to the central axis D3 and that extends between the concave first edge and the convex second edge.

A location of the concave first edge 85 that is closest to the central axis D3 is a first apex X1, such that a line tangent to the concave first edge 85 at the first apex X1 is parallel to the central axis D3. The concave first edge 85 starts at a starting location 91. In some examples, the starting location 91 represents a boundary between the first mounting portion edge 84 and the concave first edge 83. Extending through the starting location 91 and parallel to the central axis D3 is a dimension D2. Dimension D2 may also extend along the first mounting portion edge 84. A dimension D4 that is parallel to the central axis D3 extends along the second mounting portion edge 86. A dimension D1 that is parallel to the central axis D3 extends through the tip 89.

A distance "B" along the width dimension D5 between the first apex X1 and dimension D2 is about 4.5 mm. A distance "A" along the width dimension D5 between the first apex 91 and dimension D1 is about 18.5 mm. In some examples, distance A is at least two times as large as distance B, at least three times as large as distance B, at least four times as large as distance B, or about four times as large as distance B. A radius of the concave first edge 85 is about 51.8 mm. A blade width C between the concave first edge 85 and the convex second edge 87 along the width dimension D5 and passing through the first axis X1 is about 10 mm. A blade length from the tip 89 to the starting location 91 along the central axis D3 (or one of the other parallel axes) is about 79 mm. A tine height from the tip 89 to the top surface 81 is about 114 mm. A thickness of the tine 80 is about 1.5 mm. The tine 80 may be formed of tempered 1095 spring steel.

A location of the convex second edge 87 that is furthest away from the central axis D3 along the width dimension D5 and in a direction oriented from the concave first edge 85 to the convex second edge 87 is a second apex X2, such that a line tangent to the convex second edge 87 at the second apex X2 is parallel to the central axis D3. In some examples, the second apex X2 is between the central axis D3 and the dimension D4, as shown in FIG. 7. In some examples, the second apex X2 is located further away from the central axis D3 than the dimension D4.

Between the convex second edge 87 and the second mounting portion edge 86 is a concave second edge 88. A location of the concave second edge 88 that is closest to the central axis D3 is a third apex X3, such that a line tangent to the concave second edge 88 at the third apex X3 is parallel to the central axis D3. The concave second edge 88 has a radius of about 15 mm. In some examples, the concave second edge 88 extends to the second mounting portion edge 86.

A radius of the convex second edge 87 is about 50.8 mm. A distance "E" from the second apex X2 to the third apex X3 along the width dimension is about 3 mm. A distance "F" between the second apex X2 and the dimension D4 along the width dimension is about 4.1 mm. A distance "D" from the third apex X3 to the dimension D4 along the width dimension is about 7.1 mm. A blade curvature width "F" from the second apex X2 to the tip 89 along the width dimension is about 28 mm. The tip 91 is located a distance of about 23 mm away from the central axis D3 along the width dimension, and is angled at about 30 degrees with respect to the central axis D3. In some examples, the tine 80 does not include the concave second edge 88, and the convex second edge 87 extends to the second mounting portion edge 86 (either with the apex X2 being located to the right of dimension D4 in FIG. 7, or there being no apex such that the furthest point of the convex second edge 87 from the dimension D3 is aligned with dimension D4).

The mounting plate 61 has a width of about 18 mm, a height of about 31 mm, and a width of about 1.5 mm. The mounting plate 61 may be formed of tempered 1095 spring steel.

In comparison to tine 80 (FIG. 7), the prior art tine 98 (FIG. 8) includes no such apex X1, because concave edge 92 does not extend inward towards the central axis D8. Similarly, the prior art tine 98 includes no such apex X2 because the convex edge 93 does not either (1) transition into a concave edge proximal a top of the tine 80, or (2) extend further away from dimension D8 than Dimension D9. An entire blade curvature width Y is about three times a width of the concave edge 92 (with tine 80, an entire blade curvature width F is about 1.6 times a width A, and about 2.0 times a width G).

With prior art tine 98, the concave edge 92 and the convex edge 93 do not converge into a single tip, as with tine 80. Further, the tip 89 of tine 80 is a most distal portion of the tine 80 and is also a portion of the tine 80 furthest along the width dimension D5 in a direction oriented from the convex second edge 87 to the concave first edge 85 (e.g., most to the left in FIG. 7). With the prior art tine 98, the most distal portion is different from the portion oriented most to the left in FIG. 8. The tine 80 and the prior art tine 98 are illustrated in FIGS. 7 and 8 at different scales.

FIGS. 9A-9H are schematic side sectional views of the aeration rotor 30 at different angles of rotation. The aeration tine assembly 60 is one of the aeration tine assemblies 60 (shown in FIGS. 2 and 3) attached to the tine-holder shaft 58. The top surface 71 of the tine holder 70 at a proximal end of the aeration tine assembly 60 is connected to the tine-holder shaft 58. The tip 89 of tine 80 represents a distal end of the aeration tine assembly 60. The concave first edge 85 represents a leading edge of the aeration tine assembly 60, and the convex second edge 87 in combination with the concave second edge 88 represents a trailing edge of the aeration tine assembly 60.

Figure 9A:
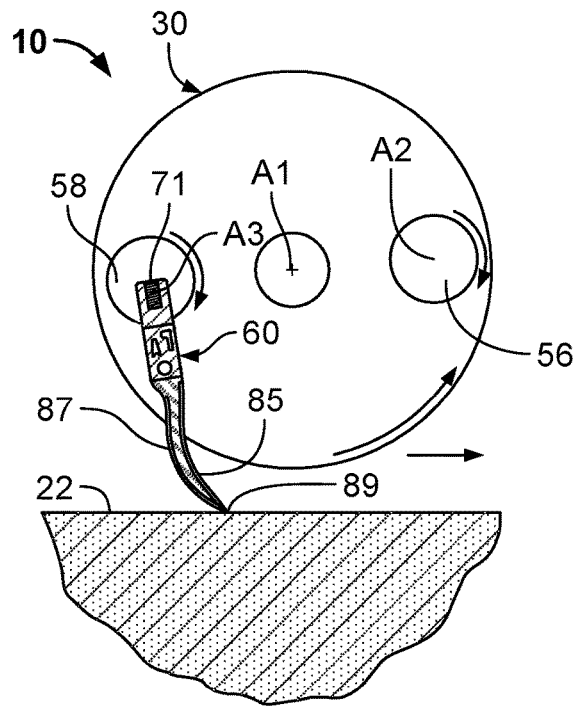
FIGS. 9A-H are schematic side sectional views of the aeration rotor at different angles of rotation.

Referring to FIGS. 9A-5H, during operation, the aeration apparatus 10 can move in a forward direction (e.g., from left to right with respect to the view shown in FIGS. 9A-5H) while the aeration rotor 30 provides the planetary motion for the aeration tine assemblies. In particular, the aeration rotor 30 can rotate in a counter-clockwise direction (with respect to the view shown in FIGS. 9A-9H), and the tine-holder shafts 56 and 58 as well as the aeration tine assemblies 60 can rotate in a clockwise direction (with respect to the view shown in FIGS. 9A-9H). With a gear ratio of 2:1, the tine-holder shafts 56 and 58 go through two revolutions for every revolution of the aeration rotor 30 and thus extend outward from a center axis A1 of the aeration rotor 30 only twice: once at the bottom and once at the top. In some embodiments, the aeration rotor 30 can operate to assist in propelling the aeration apparatus 10 forward as the aeration rotor 30 drives the aeration tines 60 into the ground surface 22.

FIG. 9A shows the aeration tine 60 beginning to penetrate the ground surface 22. The aeration tine assembly 60 is shaped so that the tip 89 of the tine 80 begins penetrating the ground surface 22 to form the leading wall 25 of the aeration pocket 21. FIGS. 9A-H show a completed aeration pocket 21 in all figures for illustrative purposes, but it should be understood that the pocket 21 would be piecewise formed throughout the process shown in FIGS. 9A-H. The aeration rotor 30 can continue rotating to cause the aeration tine 80 to further penetrate the ground surface 22.

Figure 9B:
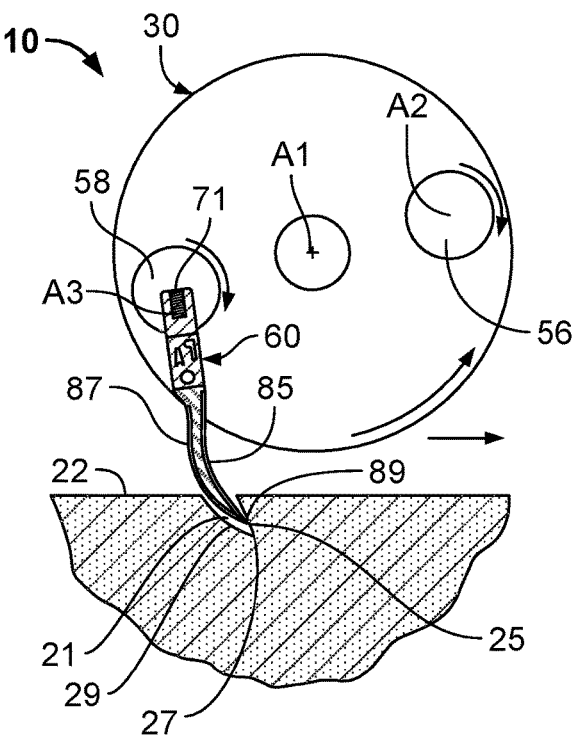
Figure 9C:
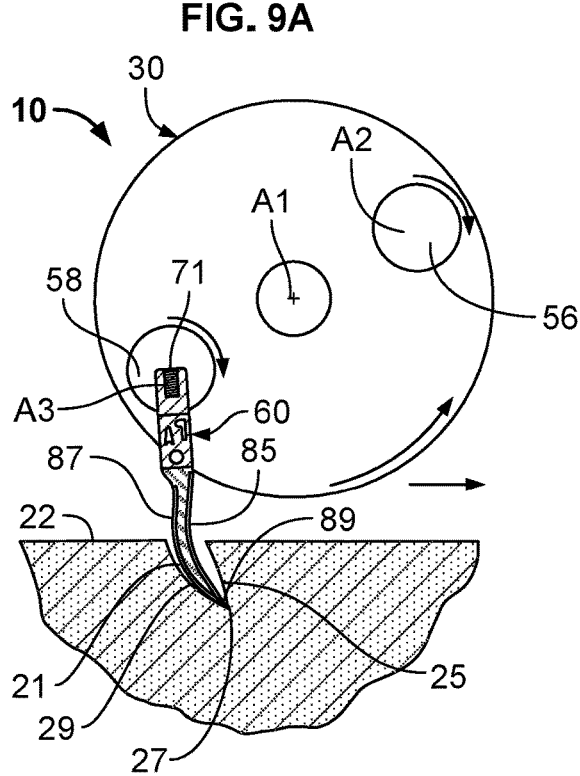

FIGS. 9B-C show the aeration tine assembly 60 extending into the ground surface 22, further defining the aeration pocket 21. In particular, the tip 89 of the tine 80 continues defining the leading wall 25 of the aeration pocket. The extension of the tine 80 into the ground surface 22 pierces the ground surface 22 using the tip 89 of the tine 80 and the concave second edge (e.g., a portion of the concave first edge 85 proximal the tip 89) to slice through the soil. In some examples, the aeration apparatus 10 is configured so that the leading wall 25 is angled slightly forward with respect to a vertical orientation, as illustrated in FIGS. 9A-H.

Figure 9D:
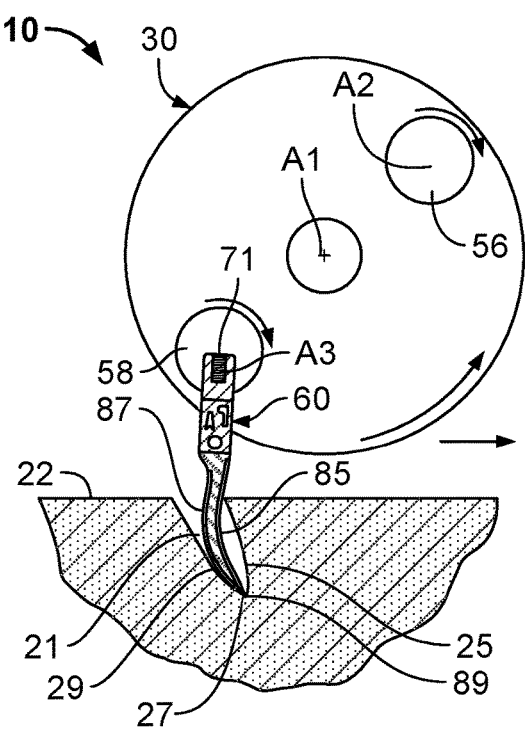
Figure 9E:
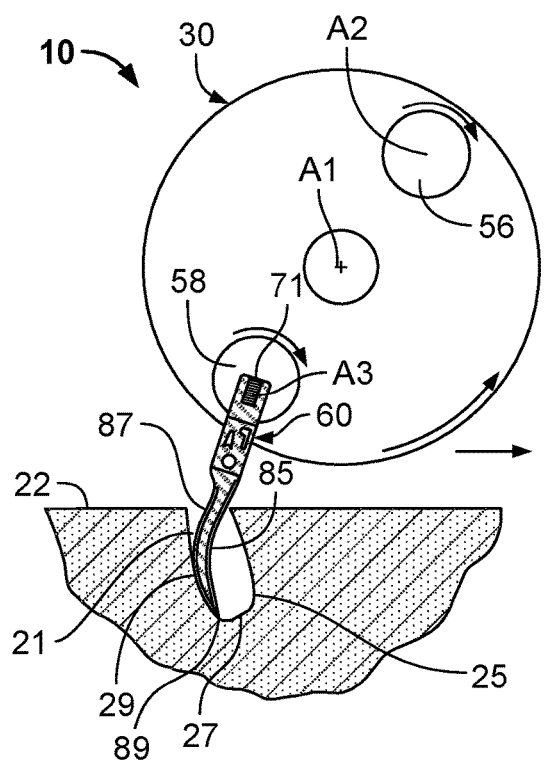

FIGS. 9D-E shows the aeration tine assembly 60 passing through a substantially vertical orientation and defining a bottom wall 27 of the aeration pocket 21. FIG. 9D shows the tip 89 of the aeration tine assembly 60 defining a forwardmost portion of the aeration pocket 21 with respect to a vertical orientation, and FIG. 9E shows the tip 89 of the aeration tine assembly 60 defining a lower-most portion of the aeration pocket 21 with respect to a horizontal orientation.

Figure 9F:
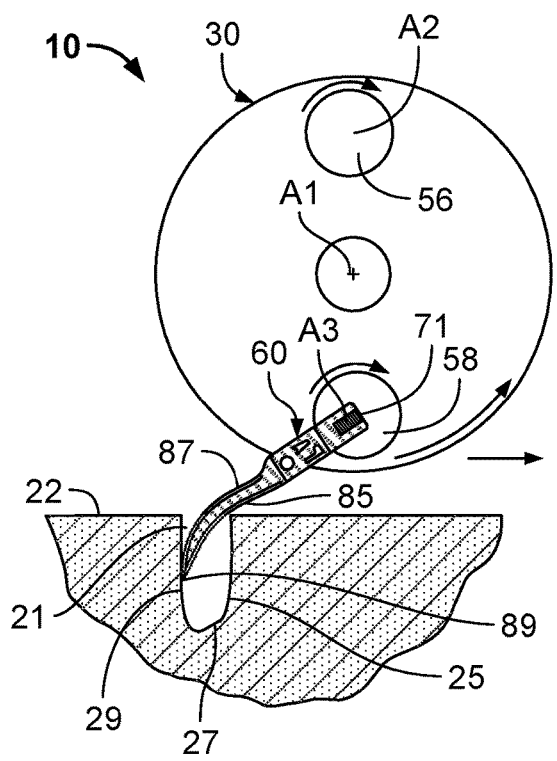
Figure 9G:
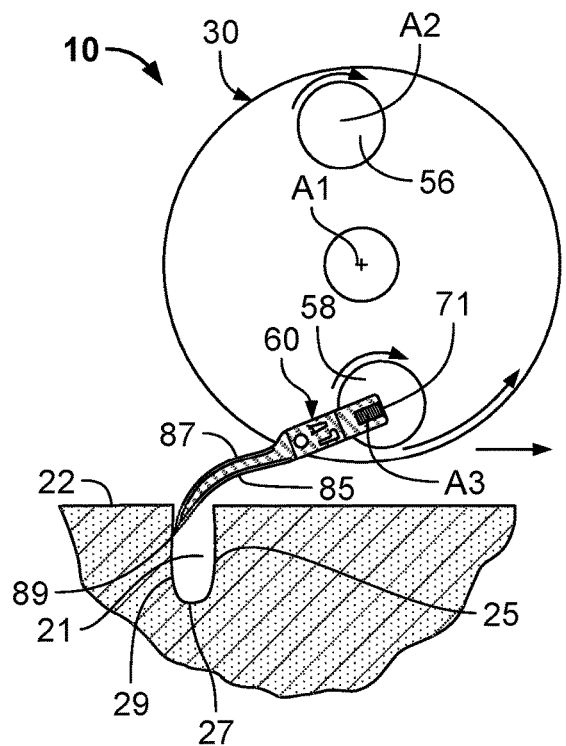

FIGS. 9F-G show the aeration tine assembly 60 withdrawing from the aeration pocket 21. As the aeration tine assembly withdraws form the aeration pocket 21, the tip 89 and a portion of the convex second edge 87 proximal the tip 89 define the trailing wall 29 of the aeration pocket 21. The portion of the convex second edge 87 that cuts through the soil during withdrawal is oriented substantially vertically. This orientation distributes the cutting operation involved in forming the trailing wall 29, advantageously slicing through soil rather than tearing/twisting through the soil. Moreover, cutting the soil with a distributed region of the convex second edge 87 as the tine 80 withdraws from the aeration pocket 21 distributes wear across the convex second edge 87 and extends a life of the tine 80. As the aeration tine assembly 60 withdraws from the aeration pocket 21, an arcuate shape of the tine 80 partially or entirely limits contact between the concave first edge 85 and the leading wall 25 of the aeration pocket, advantageously minimizing compression of soil where the leading wall 25 meets the ground surface 22.

Figure 9H:
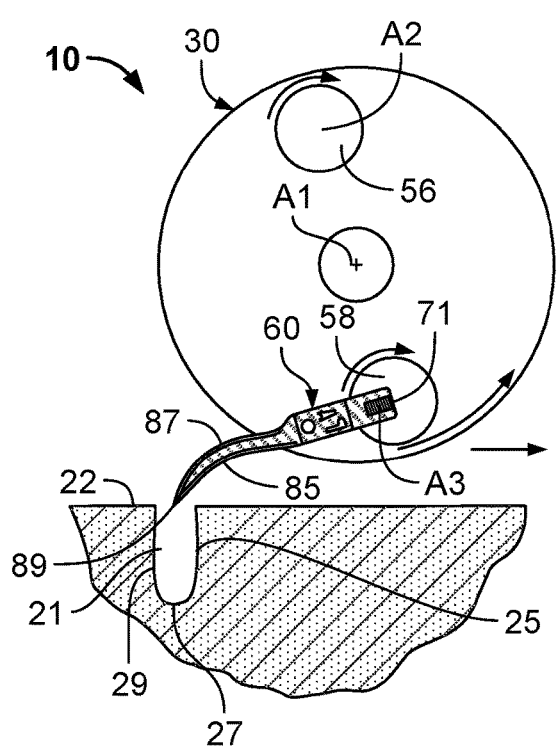

FIG. 9H shows the aeration tine assembly 60 as it exits the aeration pocket 21, with the tip 89 defining an uppermost portion of the tailing wall 29 of the aeration pocket. The aeration tine 60A can have a shape and path of movement configured for cutting a relatively narrow hole 99 (see FIG. 10). In some embodiments, the hole 99 can be sized and shaped differently than as illustrated.

In some examples, the aeration assembly 10 operates in a reverse manner, proceeding from FIG. 9H to FIG. 9A, first forming what is termed herein the trailing wall 29 and then forming the leading bottom wall 27 and then the leading wall 25. In such an embodiment, the aeration apparatus would love from right to left in FIGS. 9A-H, the aeration rotor 30 would rotate clockwise, and the tine-holder shafts 56 and 58 would rotate counter clockwise.

FIG. 10 is a top view of the ground surface 22 having soil aerated in accordance with particular embodiments of the aeration apparatus 10 (e.g., such as the embodiment depicted in FIGS. 1-3). FIG. 9 shows soil aerated using aeration tine assemblies 60 (shown in FIGS. 2-7 and 9). As the aeration apparatus 10 moves over the ground surface 22 in a forward direction, the aeration tine assemblies 60 can execute penetration, sweeping, and removal actions described above to form the openings 99. Each row of openings 99 can be staggered with respect to the neighboring rows due to the aeration tine assemblies 60 being in a staggered position relative to the aeration tine assemblies 60 on the neighboring tine-holder shaft 56 or 58.

Staggering the position of the openings 99 (shown in FIG. 17) can increase the perforation density (number of holes/slits in a given area) in the ground surface 22, thus greatly reducing soil compaction with a single pass of the aeration apparatus 10. If rotational velocity of the aeration rotor 30 is increased relative to land speed, the openings 99 can be located closer together. If desired, the openings 98 can overlap other openings 99 so as to form a continuous slit. Density of these staggered openings 99 (i.e. the number of pockets per unit area of turf) can be significantly greater than that obtained by conventional systems.

Various embodiments of the aeration apparatus 10 described above can perform relatively efficient and high quality aeration of ground surface soil. The arcuate shape of the aeration tine 80 limits compaction to a leading wall 25 of the aeration pocket 21 as the aeration tine 80 is withdrawn from the aeration pocket 21. For example, the extension of the concave first edge 85 towards the central axis D3 (as illustrated by the width "B" in FIG. 7) enables the tine 80 to sweep out of the aeration pocket 21 with the concave first edge 85 having limited or no contact with the leading wall 25 of the aeration pocket 21—resulting in limited compression of soil that forms the leading wall 25 of the aeration pocket 21.

The orientation of the tine 80 as it enters the ground surface 22 results in the tine 80 "piercing" the soil with tip 89 and distributing penetration of the soil across a length of the convex second edge 85. Similarly, the orientation of the tine 80 as it exits the ground surface 22 and forms the trailing wall 29 of the aeration pocket 21 distributes penetration of the soil across a length of the convex second edge 85. Distributing penetration across a length of the convex second edge 85 results in the tine 80 slicing the soil and limits the degree to which the tine 80 pushes the soil toward the leading wall 25, bottom wall 27, and trailing wall 29. Distributing penetration of the soil across a cutting edge also limits wear to any particular location (e.g., limits wear to the tip 89).

The orientation of the tine 80 as it enters the ground surface 22 and the arcuate shape of the tine 80 results in the aeration pocket 21 mostly or entirely being formed on the "down stroke" of tine movement. For example, FIGS. 9A-H show the tine 80 as largely having formed the aeration pocket 21 by FIG. 9E, which minimizes or eliminates the amount of soil flung out of the aeration pocket 21 by the tine 80 during the "upstroke" of tine movement. In other words, the convex edge 87 may have limited or no contact with the trailing wall 29 of the aeration pocket 21 as the tine 80 sweeps out of the aeration pocket 21.

The slicing action performed by the tine 80 also limits the force imparted by the soil to the aeration tine assembly 60 and therefore limits the motor power needed to drive the aeration apparatus 10. The reduced motor power needed can limit wear on the motor, enable faster operation, and/or enable use of a lower-powered motor (e.g., lower weight and cost).

The aeration pocket 21 may have a limited width, being more of a "slit" in the ground surface 22 than a rounded hole. The shape of the aeration pocket 21 minimizes the size of the opening 99 formed by the aeration pocket 21 at the ground surface 22, enabling the ground surface 22 to be placed into service relatively quickly (e.g., a putting green may be put back into play soon after aeration).

In some embodiments, the aeration tine assembly 60 is a single integral component. For example, the tine holder 70 may be integrally formed with the tine 60 such that there is no need for the retaining plate 61 and the fastener 64.

Various features described above can help reduce overall cost and complexity as compared to some designs, making some embodiments of the aeration apparatus easier and more affordable to manufacture and operate.

A number of embodiments of the invention have been described. Nevertheless, it will be understood that various modifications may be made without departing from the spirit and scope of the invention. For example, the specific shape and orientation of various components such as the gear system, the housing, the wheels, and the aeration rotor can be modified from those illustrated in the figures so long as the aeration apparatus is suitable for a desired application. While the aeration apparatus is illustrated as a relatively small, walk-behind apparatus, other embodiments can include features described above for a towable aeration apparatus. Thus, various embodiments of an aeration apparatus can include some but not all of the features described above. Accordingly, other embodiments are within the scope of the following claims.

What is claimed is:

1. An aeration tine assembly, comprising an aeration tine that extends from a proximal end to a tip and that includes:
   a mounting portion removably connectable to an aeration apparatus and defining a central axis that extends longitudinally through the mounting portion; and
   a curved blade portion that extends longitudinally from the mounting portion to the tip of the aeration tine and that is operable to fracture soil and form an aeration pocket, wherein the curved blade portion defines a blade width along a width dimension that is transverse to the central axis, and a blade thickness along a thickness dimension that is transverse to both the central axis and the width dimension, the blade width at a middle region of the curved blade portion being greater than the blade thickness at the middle region of the curved blade portion;
   a leading edge that extends from the proximal end to the tip and which includes a concave section that begins a curvature of the concave section at a starting location that is distal from the proximal end of the aeration tine, wherein:
      the concave section includes an apex that is closer to the central axis than the starting location, such that the concave section of the leading edge curves from the starting location inward toward the central axis before curving outward toward the tip, the apex being a closest portion of the concave section to the central axis, the leading edge being an edge of the aeration tine that is adapted to face in a direction of forward travel during formation of the aeration pocket;
      the concave section defines a first distance along the width dimension between the apex and the starting location;
      the concave section defines a second distance along the width dimension between the apex and the tip of the aeration tine;
      the second distance is greater than the first distance;
      the second distance is at least three times the first distance
      the concave section of the leading edge and the convex section of the trailing edge converge at the tip of the aeration tine; and
      the tip of the aeration tine is a most distal feature of the aeration tine with respect to the mounting portion in a direction along the central axis; and
   a trailing edge that extends from the proximal end to the tip, is opposed to the leading edge, and which includes a convex section.

2. The aeration tine assembly of claim 1, wherein the curved blade portion and the mounting portion are integrally formed from a same material.

3. The aeration tine assembly of claim 1, wherein:
   the mounting portion includes:
      (i) a mounting portion leading edge that forms a section of the leading edge; and
      (ii) a mounting portion trailing edge that forms a section of the trailing edge; and
   the mounting portion leading edge and the mounting portion trailing edge are parallel to each other and to the central axis, such that the mounting portion comprises a straight section of the aeration tine.

4. The aeration tine assembly of claim 1, wherein the aeration tine assembly is removably connectable to a mounting element of the aeration apparatus such that the central axis of the mounting portion aligns with a central axis of the mounting element of the aeration apparatus.

5. The aeration tine assembly of claim 1, wherein the tip of the aeration tine is a feature of the aeration tine located furthest away from the central axis along the width dimension and in a direction oriented from the trailing edge toward the leading edge.

6. The aeration tine assembly of claim 1, wherein the concave section of the leading edge does not extend through the center axis, such that the apex of the concave section is located on a same side of the center axis as the tip of the aeration tine.

7. The aeration tine assembly of claim 1, wherein the convex section of the trailing edge defines a second apex where the convex section of the trailing edge is furthest from the central axis along the width dimension and in a direction oriented from the leading edge to the trailing edge.

8. The aeration tine assembly of claim 7, wherein:
   the trailing edge defines a curvature width along the width dimension between the second apex of the convex section of the trailing edge and the tip of the aeration tine; and
   the curvature width is at least twice the blade width at the middle region of the curved blade portion.

9. The aeration tine assembly of claim 1, further comprising an aeration tine holder that is releasably connectable to the aeration tine, the aeration tine holder defining a bore that is aligned with the central axis of the aeration tine when the aeration tine is releasably connected to the aeration tine holder, the bore shaped to receive a mounting element of the aeration assembly.

10. The aeration tine assembly of claim 9, wherein:
the bore is located at a first end of the aeration tine holder;
the aeration tine holder defines a first opening transverse to the central axis of the aeration tine when the aeration tine is releasably connected to the aeration tine holder, the first opening located at a second end of the aeration tine holder opposite from the first end of the aeration tine holder;
the mounting portion of the aeration tine defines a second opening transverse to the central axis; and
the aeration tine assembly further comprises a fastener that extends through the first opening of the aeration tine holder and the second opening of the aeration tine when the aeration tine is releasably connected to the aeration tine holder.

11. An aeration tine assembly, comprising an aeration tine that extends from a proximal end to a tip and that includes:
a mounting portion removably connectable to an aeration apparatus and defining a central axis that extends longitudinally through the mounting portion; and
a curved blade portion that extends longitudinally from the mounting portion to the tip of the aeration tine and that is operable to fracture soil and form an aeration pocket, wherein the curved blade portion defines a blade width along a width dimension that is transverse to the central axis, and a blade thickness along a thickness dimension that is transverse to both the central axis and the width dimension, the blade width at a middle region of the curved blade portion being greater than the blade thickness at the middle region of the curved blade portion;
a leading edge that extends from the proximal end to the tip and which includes a concave section that begins a curvature of the concave section at a starting location that is distal from the proximal end of the aeration tine, wherein:
the concave section includes an apex that is closer to the central axis than the starting location, such that the concave section of the leading edge curves from the starting location inward toward the central axis before curving outward toward the tip, the apex being a closest portion of the concave section to the central axis, the leading edge being an edge of the aeration tine that is adapted to face in a direction of forward travel during formation of the aeration pocket;
the concave section defines a first distance along the width dimension between the apex and the starting location;
the concave section defines a second distance along the width dimension between the apex and the tip of the aeration tine;
the second distance is greater than the first distance; and
the second distance is about four times the first distance; and
a trailing edge that extends from the proximal end to the tip, is opposed to the leading edge, and which includes a convex section.

12. An aeration tine assembly, comprising an aeration tine that extends from a proximal end to a tip and that includes:
a mounting portion removably connectable to an aeration apparatus and defining a central axis that extends longitudinally through the mounting portion; and
a curved blade portion that extends longitudinally from the mounting portion to the tip of the aeration tine and that is operable to fracture soil and form an aeration pocket, wherein the curved blade portion defines a blade width along a width dimension that is transverse to the central axis, and a blade thickness along a thickness dimension that is transverse to both the central axis and the width dimension, the blade width at a middle region of the curved blade portion being greater than the blade thickness at the middle region of the curved blade portion;
a leading edge that extends from the proximal end to the tip and which includes a concave section that begins a curvature of the concave section at a starting location that is distal from the proximal end of the aeration tine, wherein:
the concave section includes an apex that is closer to the central axis than the starting location, such that the concave section of the leading edge curves from the starting location inward toward the central axis before curving outward toward the tip, the apex being a closest portion of the concave section to the central axis, the leading edge being an edge of the aeration tine that is adapted to face in a direction of forward travel during formation of the aeration pocket;
the concave section defines a first distance along the width dimension between the apex and the starting location;
the concave section defines a second distance along the width dimension between the apex and the tip of the aeration tine;
the second distance is greater than the first distance; and
the first distance is about 4.5 mm and the second distance is about 18.5 mm; and
a trailing edge that extends from the proximal end to the tip, is opposed to the leading edge, and which includes a convex section.

13. The aeration tine assembly of claim 12, wherein:
a length of the concave section along the center axis from the starting location to the tip of the aeration tine is about 79 mm; and
the blade thickness at the middle region of the curved blade portion is about 1.5 mm.

14. An aeration tine assembly, comprising an aeration tine that extends from a proximal end to a tip and that includes:
a mounting portion removably connectable to an aeration apparatus and defining a central axis that extends longitudinally through the mounting portion; and
a curved blade portion that extends longitudinally from the mounting portion to the tip of the aeration tine and that is operable to fracture soil and form an aeration pocket, wherein the curved blade portion defines a blade width along a width dimension that is transverse to the central axis, and a blade thickness along a thickness dimension that is transverse to both the central axis and the width dimension, the blade width at a middle region of the curved blade portion being greater than the blade thickness at the middle region of the curved blade portion;
a leading edge that extends from the proximal end to the tip and which includes a concave section that begins a curvature of the concave section at a starting location that is distal from the proximal end of the aeration tine, wherein the concave section includes an apex that is closer to the central axis than the starting location, such that the concave section of the leading edge curves from the starting location inward toward the central axis before curving outward toward the tip, the apex being a closest portion of the concave section to the central axis, the leading edge being an edge of the aeration tine that is adapted to face in a direction of forward travel during formation of the aeration pocket; and a trailing edge that extends from the proximal end to the tip, is opposed to the leading edge, and which includes a convex section, wherein:
the convex section of the trailing edge defines a second apex where the convex section of the trailing edge is furthest from the central axis along the width dimension and in a direction oriented from the leading edge to the trailing edge;
the trailing edge defines a curvature width along the width dimension between the second apex of the convex section of the trailing edge and the tip of the aeration tine;
the curvature width is at least twice the blade width at the middle region of the curved blade portion; and
the curvature width is about three times the blade width.

15. An aeration tine assembly, comprising an aeration tine that extends from a proximal end to a tip and that includes:
a mounting portion removably connectable to an aeration apparatus and defining a central axis that extends longitudinally through the mounting portion; and
a curved blade portion that extends longitudinally from the mounting portion to the tip of the aeration tine and that is operable to fracture soil and form an aeration pocket, wherein the curved blade portion defines a blade width along a width dimension that is transverse to the central axis, and a blade thickness along a thickness dimension that is transverse to both the central axis and the width dimension, the blade width at a middle region of the curved blade portion being greater than the blade thickness at the middle region of the curved blade portion;
a leading edge that extends from the proximal end to the tip and which includes a concave section that begins a curvature of the concave section at a starting location that is distal from the proximal end of the aeration tine, wherein the concave section includes an apex that is closer to the central axis than the starting location, such that the concave section of the leading edge curves from the starting location inward toward the central axis before curving outward toward the tip, the apex being a closest portion of the concave section to the central axis, the leading edge being an edge of the aeration tine that is adapted to face in a direction of forward travel during formation of the aeration pocket; and
a trailing edge that extends from the proximal end to the tip, is opposed to the leading edge, and which includes a convex section, wherein:
the convex section of the trailing edge defines a second apex where the convex section of the trailing edge is furthest from the central axis along the width dimension and in a direction oriented from the leading edge to the trailing edge; and
the trailing edge includes a concave section between the proximal end of the aeration tine and the convex section of the trailing edge.

16. The aeration tine assembly of claim 15, wherein the concave section of the trailing edge does not pass through the central axis.

17. An aeration apparatus comprising:
an aeration rotor configured for movement in a planetary motion about an axis, wherein the aeration rotor is configured to penetrate a ground surface when the aeration rotor is rotated, the aeration rotor including:
a first carrier and a second carrier;
a first tine-holder shaft extending between the first carrier and the second carrier;
a first set of aeration tine assemblies attached to the first tine-holder shaft;
a second tine-holder shaft extending between the first carrier and the second carrier; and
a second set of aeration tine assemblies attached to the second tine-holder shaft,
wherein each aeration tine assembly in the first set of aeration tine assemblies and the second set of aeration tine assemblies comprises an aeration tine that extends from a proximal end to a tip and that includes:
a mounting portion removably connectable to the first tine-holder shaft or the second tine-holder shaft of the aeration apparatus and defining a central axis that extends longitudinally through the mounting portion; and
a curved blade portion that extends longitudinally from the mounting portion to the tip of the aeration tine and that is operable to fracture soil and form an aeration pocket, wherein the curved blade portion defines a blade width along a width dimension that is transverse to the central axis, and a blade thickness along a thickness dimension that is transverse to both the central axis and the width dimension, the blade width at a middle region of the curved blade portion being greater than the blade thickness at the middle region of the curved blade portion;
a leading edge that extends from the proximal end to the tip and which includes a concave section that begins a curvature of the concave section at a starting location that is distal from the proximal end of the aeration tine, wherein the concave section includes an apex that is closer to the central axis than the starting location, such that the concave section of the leading edge curves from the starting location inward toward the central axis before curving outward toward the tip, the apex being a closest portion of the concave section to the central axis, the leading edge being an edge of the aeration tine that is adapted to face in a direction of forward travel during formation of the aeration pocket; and
a trailing edge that extends from the proximal end to the tip, is opposed to the leading edge, and which includes a convex section.

18. The aeration apparatus of claim 17, further comprising:
a motor operably connected to the aeration rotor to drive rotation of the aeration rotor such that the aeration tine assemblies in the first set of aeration tine assemblies and the second set of aeration tine assemblies can penetrate and exit a ground surface when the aeration rotor is rotated; and a frame supporting the aeration rotor and the motor and having a handle configured to be held by a user walking behind the aeration apparatus.

19. The aeration apparatus of claim 17, wherein the aeration rotor rotates in a first direction and the first tine-holder shaft and the second tine-holder shaft rotate in a second direction opposite of the first direction during rotation of the aeration rotor in the first direction.

\* \* \* \* \*